United States Patent
Boros et al.

(10) Patent No.: US 11,050,238 B2
(45) Date of Patent: Jun. 29, 2021

(54) ELECTRONIC CIRCUIT FOR PROVIDING PROTECTION FOR AN ENERGY SUPPLY FOR A RECEIVING DEVICE

(71) Applicant: Continental Teves AG & Co. oHG, Frankfurt am Main (DE)

(72) Inventors: Zoltan Boros, Timisoara (RO); Rainer Kohr, Grävenwiesbach-Laubach (DE)

(73) Assignee: Continental Teves AG & Co. oHG

(*) Notice: Subject to any disclaimer, the term of this patent is extended or adjusted under 35 U.S.C. 154(b) by 96 days.

(21) Appl. No.: 16/462,595

(22) PCT Filed: Dec. 22, 2017

(86) PCT No.: PCT/EP2017/084438
§ 371 (c)(1),
(2) Date: May 21, 2019

(87) PCT Pub. No.: WO2018/130411
PCT Pub. Date: Jul. 19, 2018

(65) Prior Publication Data
US 2020/0067301 A1    Feb. 27, 2020

(30) Foreign Application Priority Data

Jan. 12, 2017  (EP) .................................. 17465501
Feb. 7, 2017  (DE) ..................... 10 2017 201 893.3

(51) Int. Cl.
*H02H 3/10*   (2006.01)
*H02H 9/02*   (2006.01)
(Continued)

(52) U.S. Cl.
CPC .............. *H02H 3/105* (2013.01); *H02H 3/18* (2013.01); *H02H 9/025* (2013.01);
(Continued)

(58) Field of Classification Search
CPC ........ H02H 1/0007; H02H 3/08; H02H 3/087; H02H 3/10; H02H 3/105; H02H 3/12;
(Continued)

(56) References Cited

U.S. PATENT DOCUMENTS 5,654,859 A * 8/1997 Shi ........................... H02J 1/10
361/100
7,928,711 B2   4/2011 Augustyniak
(Continued)

FOREIGN PATENT DOCUMENTS

CN   102346478 A    2/2012
CN   102570377 A    7/2012
(Continued)

OTHER PUBLICATIONS

German Search Report for German Application No. 10 2017 201 893.3, with partial translation, dated Oct. 6, 2017—13 pages.
(Continued)

*Primary Examiner* — Fred E Finch, III
(74) *Attorney, Agent, or Firm* — RatnerPrestia

(57) ABSTRACT

An electronic circuit for providing protection for an energy supply for a receiving device, includes: a supply path for connecting the receiving device to a voltage source, wherein the supply path has at least one first switching component in series with a second switching component, and also a measuring resistor, a functional assembly for providing protection against an overcurrent in the supply path, a functional assembly for detecting a connected receiving device, a functional assembly for providing protection against a polarity reversal for the voltage of the supply path, and a functional assembly for detecting a ground short for the supply path.

8 Claims, 1 Drawing Sheet

(51) Int. Cl.
*H02H 3/087* (2006.01)
*H02H 3/18* (2006.01)
*H02H 1/00* (2006.01)
*H02H 7/20* (2006.01)

(52) U.S. Cl.
CPC ........... *H02H 1/0007* (2013.01); *H02H 3/087* (2013.01); *H02H 7/20* (2013.01)

(58) Field of Classification Search
CPC . H02H 3/16; H02H 3/18; H02J 7/0034; H02J 7/0036
See application file for complete search history.

(56) References Cited

U.S. PATENT DOCUMENTS

| | | | | |
|---|---|---|---|---|
| 8,537,517 | B1* | 9/2013 | Banak | H02H 11/002 361/93.1 |
| 2008/0204958 | A1 | 8/2008 | Shearon et al. | |
| 2009/0009919 | A1 | 1/2009 | Taylor | |
| 2012/0293017 | A1* | 11/2012 | Lidsky | H02H 3/18 307/126 |
| 2015/0349514 | A1* | 12/2015 | Chen | H02H 3/18 361/84 |
| 2019/0027945 | A1* | 1/2019 | Gagnon | H02J 7/0034 |
| 2019/0109479 | A1* | 4/2019 | Tsujioka | H02J 1/00 |
| 2020/0076190 | A1* | 3/2020 | La Rosa | G05F 3/205 |
| 2020/0106260 | A1* | 4/2020 | Telefus | H03K 17/687 |
| 2020/0366079 | A1* | 11/2020 | Telefus | G01R 15/202 |

FOREIGN PATENT DOCUMENTS

| | | | |
|---|---|---|---|
| CN | 102570990 | A | 7/2012 |
| CN | 104749476 | A | 7/2015 |
| CN | 105006868 | A | 10/2015 |
| DE | 3738867 | A1 | 6/1989 |
| DE | 60219268 | T2 | 1/2008 |
| DE | 102007059498 | A1 | 6/2009 |
| WO | 02082612 | A1 | 10/2002 |
| WO | 2015109357 | A1 | 7/2015 |

OTHER PUBLICATIONS

International Search Report and Written Opinion for International Application No. PCT/EP2017/084438, dated Mar. 22, 2018—10 pages.
Chinese Office Action for Chinese Application No. 201780083151.X, dated Mar. 30, 2021 with translation, 20 pages.

* cited by examiner

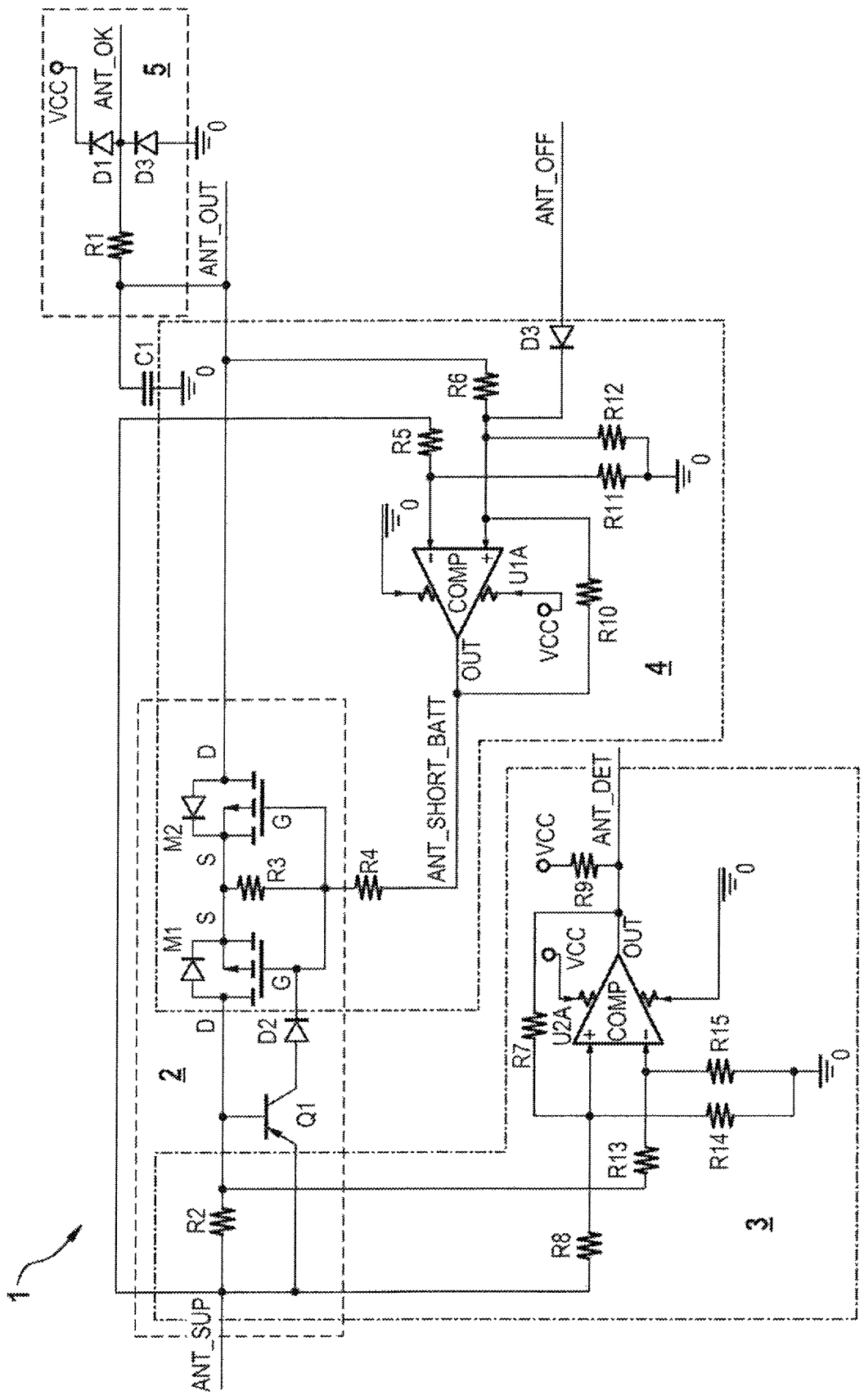

ELECTRONIC CIRCUIT FOR PROVIDING PROTECTION FOR AN ENERGY SUPPLY FOR A RECEIVING DEVICE

CROSS REFERENCE TO RELATED APPLICATIONS

This application is the U.S. National Phase Application of PCT International Application No. PCT/EP2017/084438, filed Dec. 22, 2017, which claims priority to German Patent Application No. 10 2017 201 893.3, filed Feb. 7, 2017, and European Patent Application No. 17465501.9, filed Jan. 12, 2017, the contents of such applications being incorporated by reference herein.

FIELD OF THE INVENTION

The present invention relates to an electronic circuit for providing protection for an energy supply for a receiving device.

BACKGROUND OF THE INVENTION

Usually, a receiving device of a global satellite navigation system is outside an electronic control unit with which the receiving device is associated. Frequently, such a receiving device has an internal low-noise amplifier (LNA), which is why there needs to be provision for an energy supply for the receiving device. One requirement of automotive electronic control units is that all of the circuits connected to external connections must be provided with protection against shorting to ground (GND) and battery voltage ($+V_{bat}$). Furthermore, requirements can involve an opportunity for detecting a short for the antenna connection and for detecting whether or not an antenna is connected to the antenna connection.

SUMMARY OF THE INVENTION

An aspect of the invention is an electronic circuit for providing protection for an energy supply for a receiving device. In this case, the aim is for the electronic circuit to be manufacturable in particular as inexpensively as possible.

An aspect of the invention describes an electronic circuit for providing protection for an energy supply for a receiving device, comprising:
  a supply path for connecting the receiving device to a voltage source, wherein the supply path has at least one first switching component in series with a second switching component, and also a measuring resistor,
  a functional assembly for providing protection against an overcurrent in the supply path,
  a functional assembly for detecting a connected receiving device,
  a functional assembly for providing protection against a polarity reversal for the voltage of the supply path, and
  a functional assembly for detecting a ground short for the supply path.

Advantageously, an aspect of the invention can provide an electronic circuit by means of which provision of protection for an energy supply for a receiving device is realisable. The provision of protection in this case implements in particular detection and preferably prevention of an electronically undesirable behavior to protect for example the voltage source or the components that the circuit comprises from electronic interference, damage or destruction. The circuit according to an aspect of the invention can therefore realise provision of protection against overcurrent in the supply path of the receiving device, polarity reversal for the voltage of the supply path, a short from the supply path to ground potential and detection of a connected receiving device on the supply path.

The receiving device can moreover also be configured for sending electromagnetic waves. The receiving device is particularly preferably a receiving device or antenna for a global satellite navigation system. The receiving device is preferably alternatively or additionally a transmitting/receiving device or antenna for vehicle-to-X communication.

The electronic circuit according to an aspect of the invention allows the use of cost-intensive specialised components, e.g. devices, to be avoided, since said circuit is realisable with commercially available components, which means that manufacturing costs are comparatively low.

According to a preferred development of an aspect of the invention, the measuring resistor is used at least for the functional assembly for providing protection against an overcurrent in the supply path of the receiving device and also for the functional assembly for detecting a connected receiving device.

Preferably, the first and second switching devices are used at least for the functional assembly for providing protection against an overcurrent in the supply path of the receiving device and also for the functional assembly for providing protection against a polarity reversal for the voltage of the supply path.

The partial use of components for realising different protection provision functions allows the costs of the circuit to be additionally decreased in a particularly advantageous manner.

According to an advantageous development of an aspect of the invention, the first switching component and the second switching component each have at least a gate connection, a source connection and a drain connection, wherein the source connections of the first and second switching components are connected to one another to form the series circuit and wherein the measuring resistor is connected to the drain connection of the first switching component such that the switching components are connectable to the voltage supply via the resistor. Expediently, the first switching component and/or the second switching component are metal oxide semiconductor field effect transistors, what are known as MOSFETs.

The functional assembly for protecting against an overcurrent in the supply path preferably comprises a third switching component that is connected to the supply path and the gates of the first and/or the second switching component such that in the event of a voltage drop across the measuring resistor that is dependent on the type of the third switching component, the third switching component is turned on, wherein the on state results in the current in the supply path being limited by the first and/or second switching component.

Therefore, using the third switching component in conjunction with the first and/or second switching component advantageously regulates the supply current. For the third switching component, in particular a bipolar transistor is used. Expediently, the base and emitter connections of the transistor are connected in parallel with the measuring resistor in the supply path. The collector connection of the transistor is accordingly preferably connected to the gate connections of the first and/or second switching component. The third switching component turns on in the event of a voltage drop across the measuring resistor that is dependent on the type of the third switching component. For a bipolar transistor, this value is for example approximately 0.6 to 0.7

V (diffusion voltage). The on state of the third switching component results in the gate voltages of the first and/or second switching component being increased and, as a result, the current in the supply path being limited to a value that corresponds to the relationship between the voltage drop dependent on the type of the third switching component and the value of the measuring resistor. Therefore, it is advantageously possible for a maximum current in the supply path to be prescribed.

Expediently, there is provision for a diode in the connection between a connection of the third switching component and the gates of the first and/or second switching components, wherein the cathode of the diode is connected to the gates and the anode is connected to the connection of the third switching component. The connection of the third switching component, which is connected to the gates of the first and/or second switching component, is in particular a collector of a bipolar transistor. Advantageously, the diode can protect the third switching component and the voltage supply from a reverse current in the event of a polarity reversal for the supply path.

According to a preferred embodiment of the invention, the functional assembly for detecting a connected receiving device comprises at least one comparison device, in particular a comparator, for detecting and comparing the voltage across the measuring resistor, wherein the comparison device is configured such that an output signal of the comparison device is able to be used to infer a receiving device connected to the supply path. It therefore becomes possible to establish whether a receiving device is connected to the supply path or a connection intended therefor.

The functional assembly for providing protection against a polarity reversal for the voltage of the supply path preferably comprises at least one comparison device, in particular a comparator, for comparing a voltage provided by the voltage source with a voltage to be provided to the receiving device, wherein the comparison device is connected to the first and second switching components, and the functional assembly for providing protection against a polarity reversal for the voltage of the supply path is configured so as, in the event of a higher voltage to be provided to the receiving device in comparison with the voltage provided by the voltage source, to actuate the first and/or the second switching component such that the supply path is interrupted. This allows a reverse flow of current to the voltage source to be prevented.

Preferably, the assembly for providing protection against a polarity reversal for the voltage of the supply path has a signal input, wherein the signal input is connected to the comparison device for the purpose of comparing a voltage provided by the voltage source with a voltage to be provided to the receiving device such that a defined signal on the signal input is able to perform an interruption to the supply path by means of the first and/or the second switching component.

According to a further preferred embodiment, the functional assembly for detecting a ground short for the supply path comprises at least one resistor and also at least one diode, wherein a signal connection for providing an output signal is connected to the supply path via the resistor such that a voltage to be provided to the receiving device is detectable, so that a ground short for the supply path is inferrable. When a ground short is present for the supply path, the voltage on the signal connection falls in a detectable manner, which means that detection of a short is implementable. Preferably, the functional assembly for detecting a ground short for the supply path comprises at least a first and a second diode, wherein the cathode of the first diode is connected to a supply voltage and the anode of said first diode is connected to the cathode of the second diode and also to the signal connection and the resistor. The anode of the second diode is preferably connected to ground potential or reference-ground potential.

The electronic circuit according to an aspect of the invention is expediently associated with a processor for evaluating and processing signals such that the signal for indicating a connected receiving device to the functional assembly for detecting a connected receiving device and/or the signal for indicating a polarity reversal for the supply path to the functional assembly for providing protection against a polarity reversal for the voltage of the supply path and/or the signal for indicating a ground short to the functional assembly for detecting a ground short for the supply path are supplied to the processor for evaluating and processing. By means of the processor, the signal input of the functional assembly for providing protection against a polarity reversal is able to be used to realise connection or disconnection of the voltage or energy supply of the receiving device, which allows detected problems to be reacted to. If for example the voltage or the signal for indicating a ground short falls below a defined limit value, this can be detected by the processor and the signal input can be used to interrupt the supply for the receiving device.

Preferably, the first comparator and the second comparator are provided for as a dual comparator unit or dual differential amplifier unit. The first switching device and the second switching device are preferably provided for as a dual switching component unit, in particular a dual MOSFET unit. In comparison with individual comparator or MOSFET devices, it is therefore possible for further costs to be saved.

In general, it should be pointed out that vehicle-to-X communication is understood to mean in particular a direct communication between vehicles and/or between vehicles and infrastructure devices. By way of example, it may thus be vehicle-to-vehicle communication or vehicle-to-infrastructure communication. Where this application refers to a communication between vehicles, said communication can fundamentally take place as part of a vehicle-to-vehicle communication, for example, which is typically effected without switching by a mobile radio network or a similar external infrastructure and which must therefore be distinguished from other solutions based on a mobile radio network, for example. By way of example, a vehicle-to-X communication can be effected using the IEEE 802.11p or IEEE 1609.4 standard. A vehicle-to-X communication can also be referred to as C2X communication. The subareas can be referred to as C2C (car-to-car) or C2I (car-to-infrastructure). However, an aspect of the invention explicitly does not exclude vehicle-to-X communication with switching via a mobile radio network, for example.

BRIEF DESCRIPTION OF THE DRAWINGS

Some particularly advantageous configurations of aspects of the invention are specified in the subclaims. Further preferred embodiments also emerge from the following description of exemplary embodiments on the basis of the FIGURES.

The FIGURE shows a schematic depiction of an exemplary embodiment of an electronic circuit 1 according to an aspect of the invention for providing protection for an energy supply for a receiving device of a global satellite navigation system (GNSS).

DETAILED DESCRIPTION OF THE PREFERRED EMBODIMENTS

The supply path for supplying energy to the antenna is connected to the voltage supply, not depicted, via connection ANT_SUP. The receiving device or antenna is not depicted in the FIGURE. A coil for RF decoupling ("bias tee") and a radio-frequency path are also not illustrated in the FIGURE. The connection ANT_OUT is intended for connection to the antenna. The circuit 1 comprising the supply path has, according to the example, multiple functional assemblies, which are explained separately below. There is provision in the supply path for a first MOSFET M1 and a second MOSFET M2 and also a resistor R2 in series. The MOSFETs according to the embodiment described are normally-off p-channel MOSFETs. The source connections S of the MOSFETs M1 and M2 are connected to one another. The MOSFETs M1 and M2 are connected to the voltage supply via resistor R2, for which purpose resistor R2 is connected to the drain connection D of MOSFET M1 in the supply path of the antenna.

Overcurrent Protection Device 2

The circuit 1 comprises a device for providing protection against an excessively high current in the supply path. This is realised by virtue of provision being made for transistor Q1, the base and emitter connections of which are connected to the supply path such that a flow of current and achievement of a voltage drop of approximately 0.6 V across resistor R2 result in the transistor Q1 being turned on. The collector connection of transistor Q1 is connected to the gate connections G of the MOSFETs M1 and M2, so that the on state of transistor Q1 results in the gate voltage of M1 and M2 being increased and, as a result, the current through M1 and M2 in the supply path being limited to approximately 0.6 V/R2. By prescribing the resistance value of resistor R2, it is therefore possible to prescribe a maximum current in the supply path.

In the connection between the collector connection of the transistor Q1 and the gates of the MOSFETs M1 and M2, there is provision for diode D2, which can protect transistor Q1 and the voltage supply on connection ANT_SUP from a reverse current via the parasitic diode of M2, the resistor R3 and the base-collector junction of transistor Q1 that could arise as a result of a polarity reversal for the supply path. To avoid a reverse current, it would admittedly be possible to provide for a diode in the supply path, but this would have the consequence of a corresponding voltage drop.

As will be described below, resistor R2 is also used for realising the detection of an antenna in assembly 3. Similarly, the MOSFETs M1 and M2 are also used for providing protection for a polarity reversal for the supply path of the assembly 4.

Assembly 3 for Detecting a Connected Antenna

Functional assembly 3 can be used to detect whether an antenna is connected to the output of the antenna supply ANT_OUT. In this case, there is provision for comparator U2A for detecting and comparing the voltage across the resistor R2. The output ANT_DET of comparator U2A is, according to the exemplary embodiment, at a HIGH level when the voltage across resistor R2 is above a defined limit value, corresponding to a defined flow of current through R2. The HIGH level at output ANT_DET accordingly indicates the presence of a connected antenna. The signal is preferably supplied to a processor (not depicted) associated with the electronic circuit 1 for the purpose of evaluation and processing. In the event of a LOW level, it is accordingly inferred that no antenna is connected to output ANT_OUT. The assembly 3 therefore makes it possible to establish whether an antenna is connected to connection ANT_OUT. Comparator U2A is operated by means of supply voltage VCC. VCC can be 3 V or 5 V, for example, which are frequently used.

Assembly 4 for Detecting and Protecting Against Polarity Reversal

Comparator U1A of the assembly 4 for detecting a polarity reversal is used to compare the voltages of the voltage supply at ANT_SUP and on the connection of the antenna at ANT_OUT. If the voltage on the connection of the antenna ANT_OUT is higher than the voltage of the voltage supply at ANT_SUP—that is to say in the event of there being a polarity reversal—the MOSFETs M1 and M2 are actuated by the output signal ANT_SHORT_BATT of the comparator U1A such that the circuit is interrupted. This allows a reverse flow of current to the voltage source to be prevented. Comparator U1A is operated by means of supply voltage VCC.

Preferably, the output signal ANT_SHORT_BATT of the comparator U1A is, in addition, supplied to the associated processor for monitoring. This is not depicted in the FIGURE.

Appropriate actuation of the signal input ANT_OFF, for example by the associated processor, means that comparator U1A is expediently also used to switch on and off the energy supply for the antenna.

Assembly 5 for Detecting a Short to Ground

The assembly 5 can be used to detect a ground short or short to reference-ground potential. The assembly comprises a resistor R1 and also diodes D1 and D3. Connection ANT_OUT is connected to connection ANT_OK via R1. The cathode of diode D1 is connected to the supply voltage VCC, and the anode of said diode is connected to the cathode of diode D3 and also connection ANT_OK and resistor R1. The anode of diode D3 is connected to ground potential or reference-ground potential. Furthermore, there can be provision for a filter capacitor C1 connected to resistor R1 or connection ANT_OUT and also ground potential.

According to the exemplary embodiment, the voltage on the connection ANT_OK falls when there is the ground short for the supply path. Connection ANT_OK is preferably connected to the associated processor, so that for example when the voltage on connection ANT_OK falls below a defined limit value, the processor can use connection ANT_OFF to interrupt the supply for the antenna.

By way of example, in such a case, the processor can use the control input ANT_OFF to isolate the energy supply for the antenna by means of appropriate actuation, as a result of which the power loss can also be reduced.

The resistors R3 to R15 are used for further parameterisation of the switching behavior on application-specific applications.

If it turns out in the course of the proceedings that a feature or a group of features is not absolutely necessary, then the applicant aspires right now to a wording for at least one independent claim that no longer has the feature or the group of features. This may be, by way of example, a subcombination of a claim available on the filing date or may be a subcombination of a claim available on the filing date that is limited by further features. Claims or combinations of features of this kind requiring rewording are intended to be understood to be covered by the disclosure of this application as well.

It should further be pointed out that configurations, features and variants of aspects of the invention that are described in the various embodiments or exemplary embodiments and/or shown in the figures are combinable with one another in any way. Single or multiple features are interchangeable with one another in any way. Combinations of features arising therefrom can be understood to be covered by the disclosure of this application as well.

Back-references in dependent claims are not intended to be understood as dispensing with the attainment of independent substantive protection for the features of the back-referenced subclaims. These features can also be combined with other features in any way.

Features that are disclosed only in the description or features that are disclosed in the description or in a claim only in conjunction with other features may fundamentally be of independent significance essential to an aspect of the invention. They can therefore also be individually included in claims for the purpose of distinction from the prior art.

The invention claimed is:

1. An electronic circuit for providing protection for an energy supply for a receiving device, comprising:
   a supply path for connecting the receiving device to a voltage source, wherein the supply path includes:
      a measuring resistor,
      a first switching component having a first control terminal, a first supply input terminal coupled to the measuring resistor and a first supply output terminal,
      a second switching component in series with the first switching component, the second switching component having a second control terminal, a second supply input terminal coupled to the first supply output terminal, and a second supply output terminal coupled to a load;
   an overcurrent functional assembly for providing protection against an overcurrent in the supply path, the overcurrent functional assembly including a third switching component having:
      a third control terminal coupled to the supply path between the measuring resistor and the first supply input terminal,
      a third supply input terminal coupled to the voltage source, and
      a third supply output terminal coupled to the first control terminal and the second control terminal, such that in the event of a voltage drop across the measuring resistor, the third switching component is turned ON and controls the first switching component and the second switching component to limit the current through the supply path;
   a connection status functional assembly for detecting a connected receiving device, the connection status functional assembly coupled across the measuring resistor, the connection status functional assembly outputting a connection status signal indicating that the receiving device is connected to the electronic circuit when the voltage difference across the measuring resistor is greater than a connection status threshold;
   a polarity reversal functional assembly for providing protection against a polarity reversal for the voltage of the supply path, the polarity reversal functional assembly coupled to the voltage source and to the second supply output terminal coupled to a load, the polarity reversal functional assembly turning OFF the first and second switching components when the voltage on the second supply output terminal is greater than the voltage supplied by the voltage source; and
   a ground short functional assembly for detecting a ground short for the supply path, the ground short functional assembly coupled to the second supply output terminal coupled to a load, the ground short functional assembly outputting a ground short signal indicating a ground short for the supply path when the voltage on the second supply output terminal is less than a ground short threshold.

2. The electronic circuit as claimed in claim 1, wherein the measuring resistor is used at least for the overcurrent functional assembly for providing protection against an overcurrent in the supply path of the receiving device and also for the connection status functional assembly for detecting a connected receiving device.

3. The electronic circuit as claimed in claim 1, wherein the first and second switching components are used at least for the overcurrent functional assembly for providing protection against an overcurrent in the supply path of the receiving device and also for the polarity reversal functional assembly for providing protection against a polarity reversal for the voltage of the supply path.

4. The electronic circuit as claimed in claim 1, wherein the connection status functional assembly for detecting a connected receiving device comprises at least one comparison device for detecting and comparing the voltage across the measuring resistor, wherein the comparison device is configured such that an output signal of the comparison device is able to be used to infer a receiving device connected to the supply path.

5. The electronic circuit as claimed in claim 1, wherein the polarity reversal functional assembly for providing protection against a polarity reversal for the voltage of the supply path comprises at least one comparison device for comparing a voltage provided by the voltage source with a voltage to be provided to the receiving device, wherein the comparison device is connected to the first and second switching components, and the polarity reversal functional assembly for providing protection against a polarity reversal for the voltage of the supply path is configured so as, in the event of a higher voltage to be provided to the receiving device in comparison with the voltage provided by the voltage source, to actuate the first and/or the second switching component such that the supply path is interrupted.

6. The electronic circuit as claimed in claim 5, wherein the polarity reversal functional assembly for providing protection against a polarity reversal for the voltage of the supply path has a signal input, wherein the signal input is connected to the comparison device for the purpose of comparing a voltage provided by the voltage source with a voltage to be provided to the receiving device such that a defined signal on the signal input is able to perform an interruption to the supply path by means of the first and/or the second switching component.

7. The electronic circuit as claimed in claim 1, wherein the around short functional assembly for detecting a ground short for the supply path comprises at least one resistor, wherein a signal connection for providing an output signal is connected to the supply path via the resistor such that a voltage to be provided to the receiving device is detectable, so that a ground short for the supply path is inferrable.

8. An electronic circuit for providing protection for an energy supply for a receiving device, comprising:
a supply path for connecting the receiving device to a voltage source, wherein the supply path includes:
a measuring resistor,
a first switching component having a first control terminal, a first supply input terminal coupled to the measuring resistor and a first supply output terminal,
a second switching component in series with the first switching component, the second switching component having a second control terminal, a second supply input terminal coupled to the first supply output terminal, and a second supply output terminal coupled to a load;
a functional assembly for providing protection against an overcurrent in the supply path, the functional assembly including a third switching component having:
a third control terminal coupled to the supply path between the measuring resistor and the first supply input terminal,
a third supply input terminal coupled to the voltage source, and
a third supply output terminal coupled to the first control terminal and the second control terminal, such that in the event of a voltage drop across the measuring resistor, the third switching component is turned ON and controls the first switching component and the second switching component to limit the current through the supply path;
a functional assembly for detecting a connected receiving device;
a functional assembly for providing protection against a polarity reversal for the voltage of the supply path;
a functional assembly for detecting a ground short for the supply path; and
a diode connected between the third switching component and the first and second control terminals of the first and second switching components,
wherein the cathode of the diode is connected to the first and second control terminals and the anode is connected to third supply output terminal of the third switching component.

* * * * *